Jan. 1, 1952     J. H. COUTELEN     2,581,079
TALKING MACHINE COMBINED WITH A STILL
PROJECTOR AND FILM STRIP THEREFOR
Filed Feb. 12, 1948
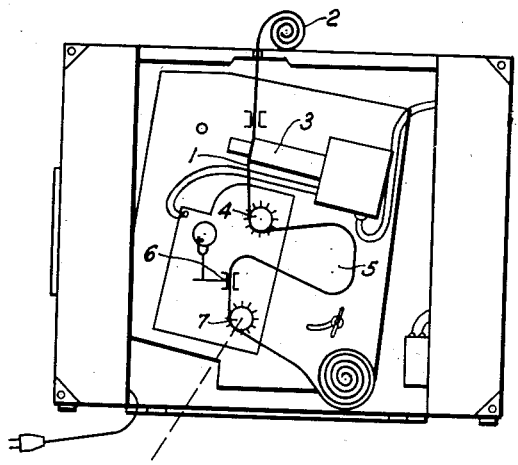
*Fig. 1*
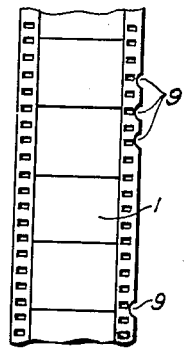
*Fig. 2*
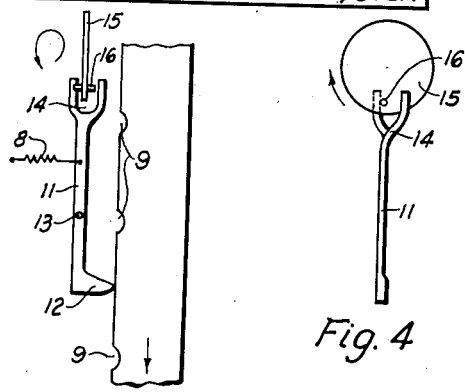
*Fig. 3*     *Fig. 4*
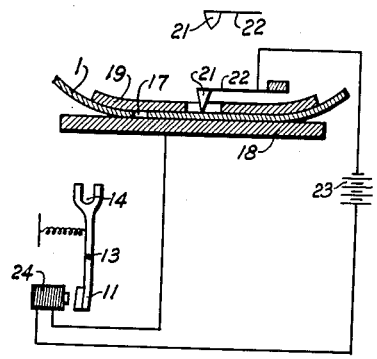
*Fig. 5*
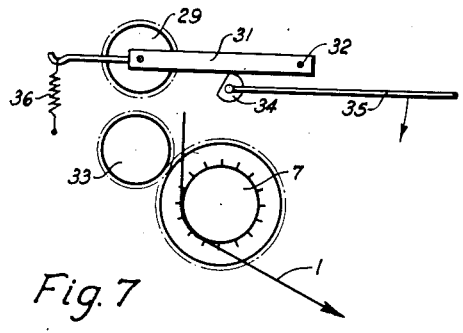
*Fig. 7*
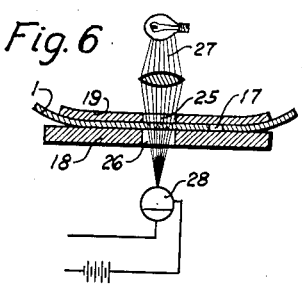
*Fig. 6*
INVENTOR.
JULIEN HENRI COUTELEN
BY Patented Jan. 1, 1952

2,581,079

UNITED STATES PATENT OFFICE 2,581,079

TALKING MACHINE COMBINED WITH A STILL PROJECTOR AND FILM STRIP THEREFOR

Julien Henri Coutelen, Levallois Perret, France, assignor, by mesne assignments, to Dukane Corporation, a corporation of Illinois Application February 12, 1948, Serial No. 7,754
In France July 25, 1939

Section 1, Public Law 690, August 8, 1946
Patent expires July 25, 1959

6 Claims. (Cl. 88—28)

For meetings, lectures, etc., installations have been previously employed comprising a talking machine which renders the text of the meeting or lecture and a projector which causes to appear upon a screen a series of still images serving as illustration. For example, with reference to a meeting on art, certain reproductions of paintings or with reference to a lecture on travel, views of landscapes or monuments.

In apparatus used up to the present time, the change of the images had been effected manually by an operator. The object of the present invention is an apparatus comprising a phonograph and a projector in combination, the changes of the picture being produced automatically at the desired instant during the meeting or lecture. For this purpose, the phonograph drives by means of a continuous movement in synchronism with the movement of the support of the sound record, disc or film, etc., a film carrying marks which traveling past a suitable element of the projector, release the movement of a driving device which each time substitutes one image for another one in front of the projector.

The following description and the accompanying drawings show, by way of example, various methods of embodiment of the invention.

Fig. 1 is a diagrammatic section showing the assembly of the view changing device.

Fig. 2 shows a film which serves as carrier of the images and at the same time serves for actuating the operating mechanism.

Figs. 3 and 4 show in elevation and viewed in two planes at right angle to each other, an escapement system actuating the operating mechanism.

Figs. 5 and 6 show electric controls of the escapement device.

Fig. 7 is a clutch and transmission system of the operating mechanism for continuous movement with the system, the motor being actuated synchronously by the phonograph.

Obviously, any suitable carriers may be used, for example, glass plates, for the images, the substitution of one plate for another being effected by any known mechanism which would be actuated through the passage of marks carried by the film at a predetermined point, the film having a movement synchronous to that of the phonograph. Furthermore, the successive images could be applied on a film, and in that case it is advantageous, as shown in Fig. 1, to employ a single film only which carries the images and also carries the markings, the latter being located at the edge of the film.

In order to permit the markings to travel in a continuous movement while the images advance intermittently only, the film forms a loop between the projector and the element which releases the image changing mechanism.

The film 1 is unwound from a reel 2 and passes into the projector 3, then on a sprocket 4 actuated by the operating mechanism which causes it to advance to produce the change of image. It then forms a loop at 5 of sufficient size and passes at 6 in front of the element actuated by the markings and which will be described in detail below. It then engages the sprocket 7 which is actuated in a movement synchronous to that of the phonograph, the wheel 7 will be connected by a transmission chain or some other device with a shaft of the turntable.

The film shown in Fig. 2 is similar to an ordinary motion picture film but it carries on one of its edges notches 9 which constitute the markings. The Figs. 3 and 4 show diagrammatically the element producing the release of the actuating mechanism which causes the wheel 4 to turn. A lever 11 terminating at one end in a nose 12 is pivoted at 13 and a spring 8 has a tendency to maintain the nose 12 applied against the edge of the film 2. At its other end, the lever carries a fork 14 between the prongs of which a disc 15 may rotate, the disc being traversed by a pin 16, the ends of which may come into contact with either of the prongs of the fork, depending upon the lever being in the position shown, or its nose 12 being engaged in one of the notches 9. The disc 15 is mounted on a shaft which a suitable mechanical or electric motor urges to rotate in direction of the arrow. This movement is normally prevented by the pin 15 abutting the first prong of the fork 14. But when the nose 12 is engaged in a notch 9, the pin will be disengaged from the fork and the disc will rotate approximately one revolution, whereupon the disc will be stopped due to the fact that the pin 16 will abut against the second prong of the fork which is slightly back of the first one. As soon as the nose leaves the notch, the disc rotates again, but solely through a small angle necessary to bring the pin against the first prong of the fork.

It is obvious that this escapement device which is, however, known in itself, has been described here solely by way of example and can be replaced by another one.

The disc 15 having made a revolution, actuates through a suitable transmission the sprocket 4 which causes the film to advance the length of one image. While the wheel 4 stops, the portion of the film which is past said sprocket advances continuously by decreasing the size of the loop 5, the latter being enlarged each time that an image is substituted for another.

It is also obvious that without exceeding the scope of the invention, numerous modifications may be applied to the apparatus just described. For example, the escapement mechanism may be actuated electrically, the rocking movement of the lever 12 being produced by the passage of a current into an electromagnet. For this purpose, one might employ, for instance, the device shown diagrammatically in Fig. 5. The film 1, the edge of which is not any more provided with notches but which has openings 17, passes against a metallic plate 18 being retained by a supporting plate 19. A nose 21 carried by a leaf spring 22 rests against this film, and upon the passage of an opening such as 17, the nose comes into contact with the plate 18. In this position it closes an electric circuit containing a battery 23 and an electromagnet 24 which causes a lever 11 similar to that of Fig. 3 to rock.

The electromagnet 24 might, furthermore, operate directly the feeding device.

It would also be feasible to employ the device shown in Fig. 6 wherein apertures 25 and 26 are provided opposite each other in the plate 18 and 19, and a luminous ray emanating from an optical system 27 strikes a photoelectric cell 28 when an opening 17 passes in front of these windows. The cell then permits passage of a current which operates a system having an electromagnet, not shown, such as that of Fig. 5. The opening 17 in this instance, could be replaced by a transparent portion provided on an opaque strip of the film.

It will be understood that it is essential to maintain perfect synchronism between the movement of the markings such as the notches 9 and the movement of the phonograph disc, so that the changes of images should take place just at the instant at which the phonograph pronounces certain words. It will not be difficult to maintain the speeds constantly equal by causing the wheel 7 and the turntable to be operated by the same motor. But also, it is necessary that the point of the film corresponding to the first words passes a predetermined point, for example the element 6, when these words are pronounced. Now, in an ordinary disc, the first groove or grooves are not engraved, and it is only after a certain time that after having placed the needle on the margin of the disc, that the emission of sound begins. In order to provide for the synchronism, the film will primarily be arranged so that a special marking corresponding to the first words is located in front of the element 6, for example, and that the operator will couple the wheel 7 with the motor mechanism of the turntable at the instant at which the phonograph begins to talk. This coupling may be effected in numerous ways, for example, by means of the device shown in Fig. 7.

The motor of the turntable causes a toothed wheel 29 mounted at the end of a lever 31 pivoted at 32 to ratate, by means of a suitable transmission. When this lever is lowered, the wheel 29 enters into engagement with a gear 33 which actuates the sprocket 7. The lever 31 engages a cam 34 mounted on a shaft 35, and a spring 36 tends to lower it, placing the gears 29 and 33 into engagement. In order to bring about this engagement at the desired instant, that is, when the phonograph begins to speak, the operator has nothing else to do but to turn the shaft 35, for example by means of a button, not shown.

It is obvious that many other coupling devices can be used.

It is advisable in an apparatus of the type described, to give the projector a certain movability, permitting an adjustment for properly centering the projected images on the screen.

It should, furthermore, be understood that the invention is not limited to the devices described and shown herein and by way of example only, and that very numerous modifications might be applied thereto.

What is claimed is:

1. A strip of film for still projection in a combined sound reproducing and picture projecting system, said film having a picture track and a control track along the length of said film, said picture track having a plurality of still pictures disposed at regular intervals along a predetermined length of the film strip for successive promined projection for irregular periods of time, said control track having an effective control length along a different predetermined length of said film strip, said control track having spaced, discrete deformations successively disposed along the control track length, each deformation corresponding to a still picture and functioning to initiate an exposure cycle for its corresponding picture for a period of time directly proportional to the distance along the control track up to the succeeding deformation, when a new picture is to be projected, the part of a control track which is effective for its corresponding picture being movable in said system at a speed directly proportional to the speed of a sound track in the sound reproducing part of the system.

2. The film of claim 1 wherein said deformations comprise photographically contrasting spots against a film background in said control track whereby a particular deformation alters the light properties of the film.

3. In a system for providing synchronized sound reproduction and still projection, the improvement comprising a film projector having a film gate, means for advancing one picture of said film only through said gate for each operating cycle of said advancing means, a reproducing system for reproducing sound from a record which is physically independent of said picture film, said reproducing system including means for moving said sound record, means spaced from the projection gate for advancing film continuously, said film having a picture track with a plurality of still pictures disposed at regular intervals along a predetermined length of the film strip for successive projection for irregular periods of time, said film also having a control track having an effective control length along a different predetermined length of said film strip, said control track having spaced, discrete deformations successively disposed along the control track length, each deformation corresponding to a still picture, means for synchronizing said sound record moving means and said continuous film advancing means, means controlled by a film deformation for initiating an operating cycle to advance a still picture, said means being located near the continuous film advance means to cooperate with that portion of the film which is being continuously advanced, the film deformation which is effective for initiating the operating cycle corresponding to the picture which it has caused to be moved into projecting position and being displaced therefrom along the length of film a sufficient distance to provide a film loop between the projecting gate and the continuous film advance means.

4. The system according to claim 3 wherein said film control track and deformations are sharply contrasting to control light transmission and wherein said means for initiating an operating cycle includes a source of light and a photoelectric cell cooperating with said track and said deformations.

5. The system according to claim 3 wherein said film deformations consist of cut-outs in the film and wherein said means for initiating an operating cycle includes at least one finger riding along the control track of said film.

6. The system according to claim 3 wherein said film deformations consist of cut-outs in the film and wherein said means for initiating an operating cycle includes at least one switch finger riding along the control track of said film and adapted to cooperate with an additional contact for controlling a circuit.

JULIEN HENRI COUTELEN.

REFERENCES CITED

The following references are of record in the file of this patent:

UNITED STATES PATENTS

| Number | Name | Date |
|---|---|---|
| 1,065,135 | Ivatts | June 17, 1913 |
| 1,083,498 | Kitsee | Jan. 6, 1914 |
| 1,254,684 | Greensfelder | Jan. 29, 1918 |
| 1,499,941 | Marette | July 1, 1924 |
| 1,826,786 | Hopkins | Oct. 13, 1931 |
| 1,859,665 | Golden et al. | May 24, 1932 |
| 1,909,765 | Jenkins et al. | May 16, 1933 |
| 1,921,494 | Wildhaber | Aug. 8, 1933 |
| 1,987,544 | Wood et al. | Jan. 8, 1935 |
| 1,998,889 | Wier | Apr. 23, 1935 |
| 2,036,666 | Wier | Apr. 7, 1936 |
| 2,086,554 | Horn | July 13, 1937 |
| 2,116,314 | Jenkins et al. | May 3, 1938 |
| 2,136,209 | Finch | Nov. 8, 1938 |
| 2,141,037 | Franklin | Dec. 20, 1938 |

FOREIGN PATENTS

| Number | Country | Date |
|---|---|---|
| 858,233 | France | May 6, 1940 |